US012567353B2

(12) United States Patent
Woo et al.

(10) Patent No.: US 12,567,353 B2
(45) Date of Patent: Mar. 3, 2026

(54) GATE DRIVER, DISPLAY DEVICE INCLUDING THE GATE DRIVER, AND ELECTRONIC DEVICE INCLUDING THE DISPLAY DEVICE

(71) Applicant: Samsung Display Co., LTD., Yongin-si (KR)

(72) Inventors: Minkyu Woo, Yongin-si (KR); Jihoon Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/970,489

(22) Filed: Dec. 5, 2024

(65) Prior Publication Data

US 2025/0232705 A1 Jul. 17, 2025

(30) Foreign Application Priority Data

Jan. 16, 2024 (KR) ........................ 10-2024-0006609

(51) Int. Cl.
*G09G 3/3266* (2016.01)
*G09G 3/20* (2006.01)

(52) U.S. Cl.
CPC ... *G09G 3/2092* (2013.01); *G09G 2310/0267* (2013.01); *G09G 2310/08* (2013.01)

(58) Field of Classification Search
CPC ... G09G 2310/0286; G09G 2310/0267; G09G 2310/0289; G09G 2310/08; G09G 3/3266
See application file for complete search history.

(56) References Cited

U.S. PATENT DOCUMENTS

| | | | | |
|---|---|---|---|---|
| 2017/0263330 A1* | 9/2017 | Hao | ........................ | G11C 19/28 |
| 2019/0347996 A1* | 11/2019 | Zhu | ........................ | G11C 19/28 |
| 2023/0260462 A1* | 8/2023 | Chen | ........................ | G11C 19/28 345/214 |

FOREIGN PATENT DOCUMENTS

| | | |
|---|---|---|
| KR | 10-1975581 | 4/2019 |

* cited by examiner

*Primary Examiner* — Dennis P Joseph
(74) *Attorney, Agent, or Firm* — Womble Bond Dickinson (US) LLP

(57) ABSTRACT

A gate driver includes an input circuit, a level control circuit, a pull down circuit, and a voltage output circuit. The level control circuit includes a first p-type metal-oxide-semiconductor (PMOS) transistor including a gate electrode connected to a first control node, a first electrode receiving a clock signal, and a second electrode, a first capacitor including a first electrode connected to the second electrode of the first PMOS transistor and a second electrode connected to the first control node, and a first NMOS transistor including a gate electrode receiving a low gate voltage, a first electrode connected to the first control node, and a second electrode connected to a second control node.

21 Claims, 14 Drawing Sheets

GATE DRIVER, DISPLAY DEVICE INCLUDING THE GATE DRIVER, AND ELECTRONIC DEVICE INCLUDING THE DISPLAY DEVICE

CROSS-REFERENCE TO RELATED APPLICATION

The present application claims priority to and the benefit of Korean Patent Application No. 10-2024-0006609, filed on Jan. 16, 2024, in the Korean Intellectual Property Office, the entire disclosure of which is incorporated herein by reference.

BACKGROUND

1. Field

Aspects of some embodiments of the present disclosure relate to a gate driver, a display device including the gate driver, and an electronic device including the display device.

2. Description of the Related Art

In general, a display device includes a display panel and a display panel driver. The display panel includes gate lines, data lines, and pixels. The display panel driver includes a gate driver for providing gate signals to the gate lines, a data driver for providing data voltages to the data lines, and a driving controller for controlling the gate driver and the data driver.

The gate driver may include a pull down circuit which pulls down the gate signal to a low gate voltage in response to a voltage of an internal node, and the pull down circuit may include a p-type metal-oxide-semiconductor (PMOS) transistor. For the PMOS transistor to be sufficiently turned on, the voltage of the internal node may desirably be lower than the low gate voltage. When the voltage of the internal node is higher than the low gate voltage, the PMOS transistor may not be sufficiently turned on. When the PMOS transistor is not sufficiently turned on and then sufficiently turned on, the gate signal may fall in two steps, and a horizontal line may be visible on the display device.

The gate driver may include a pull up circuit which pulls up the gate signal to a high gate voltage in response to a voltage of an internal node, and the pull up circuit may be composed of an n-type metal-oxide-semiconductor (NMOS) transistor. For the NMOS transistor to be sufficiently turned on, the voltage of the internal node may desirably be higher than the high gate voltage. When the voltage of the internal node is lower than the high gate voltage, the NMOS transistor may not be sufficiently turned on. When the NMOS transistor is not sufficiently turned on and then sufficiently turned on, the gate signal may rise in two steps, and the horizontal line may be visible on the display device.

The above information disclosed in this Background section is only for enhancement of understanding of the background and therefore the information discussed in this Background section does not necessarily constitute prior art.

SUMMARY

Aspects of some embodiments of the present disclosure relate to a gate driver and a display including the gate driver. For example, aspects of some embodiments of the present disclosure relate to a gate driver and a display including the gate driver for relatively stably outputting a gate signal.

Aspects of some embodiments of the present disclosure include a gate driver for controlling a voltage level of an internal node for a gate signal to fall in one step.

Aspects of some embodiments of the present disclosure include a display device including the gate driver.

Aspects of some embodiments of the present disclosure include an electronic device including the display driver.

In a gate driver according to some embodiments of the present disclosure, the gate driver comprises an input circuit configured to output an input signal to a first control node, a level control circuit connected between the first control node and a second control node and configured to control a voltage level of the second control node, a pull down circuit configured to pull down a gate signal to a low gate voltage in response to a voltage of the second control node and output the gate signal to a gate output node, and a voltage output circuit connected to the gate output node or connected to at least one of the first control node and the second control node and the gate output node. According to some embodiments, the level control circuit may include a first PMOS transistor including a gate electrode connected to the first control node, a first electrode receiving a clock signal, and a second electrode, a first capacitor including a first electrode connected to the second electrode of the first PMOS transistor and a second electrode connected to the first control node, and a first NMOS transistor including a gate electrode receiving the low gate voltage, a first electrode connected to the first control node, and a second electrode connected to the second control node.

According to some embodiments, the input circuit may include a second PMOS transistor including a gate electrode receiving the low gate voltage, a first electrode receiving the input signal, and a second electrode connected to the first control node.

According to some embodiments, the pull down circuit may include a third PMOS transistor including a gate electrode connected to the second control node, a first electrode receiving the low gate voltage, and a second electrode connected to the gate output node.

According to some embodiments, when a voltage of the first control node is lower than a voltage obtained by subtracting a threshold voltage of the first NMOS transistor from the low gate voltage, the first NMOS transistor may be turned on.

According to some embodiments, in a first duration, the input signal may have a high gate voltage and the clock signal may have the high gate voltage.

According to some embodiments, in the first duration, the input circuit may be configured to output the input signal having the high gate voltage to the first control node, the first control node has the high gate voltage, and the first PMOS transistor may be turned off.

According to some embodiments, in the first duration, the first NMOS transistor may be turned off, and the second control node may have the high gate voltage.

According to some embodiments, in a second duration after the first duration, the input signal may have a low gate voltage and the clock signal has the high gate voltage.

According to some embodiments, in the second duration, the input circuit may receive the input signal having the low gate voltage and be configured to output a first low gate voltage to the first control node, the first control node may have the first low gate voltage, and the first PMOS transistor may be turned on.

According to some embodiments, in the second duration, the first NMOS transistor may be turned off, and the second control node may have the high gate voltage.

According to some embodiments, in a third duration after the second duration, the clock signal may have the low gate voltage.

According to some embodiments, in the third duration, the first PMOS transistor may be turned on, and the voltage of the first control node be boosted by the first capacitor to have a third low gate voltage.

According to some embodiments, in the third duration, the first NMOS transistor may be turned on, and the second control node may have the third low gate voltage.

According to some embodiments, in a fourth duration after the third duration, the clock signal may have the high gate voltage.

According to some embodiments, in the fourth duration, the first PMOS transistor may be turned on, and a voltage of the first control node may be boosted by the first capacitor to have a first low gate voltage.

According to some embodiments, in the fourth duration, the first NMOS transistor may be turned on, and the second control node may have a second low gate voltage.

According to some embodiments, the voltage output circuit may include a fourth PMOS transistor including a gate electrode connected to an inverting control node, a first electrode receiving a high gate voltage, and a second electrode connected to the gate output node, a fifth PMOS transistor including a gate electrode connected to the inverting control node, a first electrode receiving the high gate voltage, and a second electrode, a sixth PMOS transistor including a gate electrode, a first electrode receiving the high gate voltage, and a second electrode connected to the inverting control node, a seventh PMOS transistor including a gate electrode receiving the clock signal, a first electrode, and a second electrode connected to the inverting control node, an eighth PMOS transistor including a gate electrode receiving the low gate voltage, a first electrode connected to the first control node, and a second electrode connected to the gate electrode of the sixth PMOS transistor, a ninth PMOS transistor including a gate electrode receiving the low gate voltage, a first electrode connected to the second electrode of the fifth PMOS transistor, and a second electrode connected to the second control node, a second NMOS transistor including a gate electrode receiving the input signal, a first electrode receiving the low gate voltage, and a second electrode connected to the first electrode of the seventh PMOS transistor, and a second capacitor including a first electrode receiving the high gate voltage and a second electrode connected to the inverting control node.

In a gate driver according to some embodiments of the present disclosure, the gate driver comprises an input circuit configured to output an input signal to a first control node, a level control circuit connected between the first control node and a second control node and configured to control a voltage level of the second control node, a pull up circuit configured to pull up a gate signal to a low gate voltage in response to a voltage of the second control node and output the gate signal to a gate output node, and a voltage output circuit connected to the gate output node or connected to at least one of the first control node and the second control node and the gate output node. According to some embodiments, the level control circuit may include a first NMOS transistor including a gate electrode connected to the first control node, a first electrode receiving a clock signal, and a second electrode, a first capacitor including a first electrode connected to the second electrode of the first PMOS transistor and a second electrode connected to the first control node, and a first PMOS transistor including a gate electrode receiving the high gate voltage, a first electrode connected to the first control node, and a second electrode connected to the second control node.

According to some embodiments, the input circuit may include a second NMOS transistor including a gate electrode receiving the high gate voltage, a first electrode receiving the input signal, and a second electrode connected to the first control node.

In a display device according to some embodiments of the present disclosure, the display device includes a display panel and a gate driver configured to provide a gate driver to the display panel. According to some embodiments, the gate driver includes an input circuit configured to output an input signal to a first control node, a level control circuit connected between the first control node and a second control node and configured to control a voltage level of the second control node, a pull down circuit configured to pull down the gate signal to a low gate voltage in response to a voltage of the second control node and output the gate signal to a gate output node, and a voltage output circuit connected to the gate output node or connected to at least one of the first control node and the second control node and the gate output node. According to some embodiments, the level control circuit includes a first PMOS transistor including a gate electrode connected to the first control node, a first electrode receiving a clock signal, and a second electrode, a first capacitor including a first electrode connected to the second electrode of the first PMOS transistor and a second electrode connected to the first control node, and a first NMOS transistor including a gate electrode receiving the low gate voltage, a first electrode connected to the first control node, and a second electrode connected to the second control node.

In an electronic device according to some embodiments of the present disclosure, the electronic device includes a display panel, a gate driver configured to provide a gate driver to the display panel, and a power supply configured to provide a power to the display panel and the gate driver. According to some embodiments, the gate driver includes an input circuit configured to output an input signal to a first control node, a level control circuit connected between the first control node and a second control node and configured to control a voltage level of the second control node, a pull down circuit configured to pull down the gate signal to a low gate voltage in response to a voltage of the second control node and output the gate signal to a gate output node, and a voltage output circuit connected to the gate output node or connected to at least one of the first control node and the second control node and the gate output node. According to some embodiments, the level control circuit includes a first PMOS transistor including a gate electrode connected to the first control node, a first electrode receiving a clock signal, and a second electrode, a first capacitor including a first electrode connected to the second electrode of the first PMOS transistor and a second electrode connected to the first control node, and a first NMOS transistor including a gate electrode receiving the low gate voltage, a first electrode connected to the first control node, and a second electrode connected to the second control node.

In a gate driver according to some embodiments of the present disclosure, the stage of the gate driver may include the first PMOS transistor, the first capacitor, and the first NMOS transistor, and the voltage of the first control node may be boosted by the first capacitor. According to some embodiments, when the voltage of the first control node is not lower than a specific level, the first NMOS transistor may not output the voltage of the first control node to the second control node. Therefore, the voltage level of the second control node may be controlled and the gate signal may fall in one step.

In a gate driver according to some embodiments, the stage of the gate driver may include the first NMOS transistor, the first capacitor, and the first PMOS transistor, and the voltage of the first control node may be boosted to the first capacitor. According to some embodiments, when the voltage of the first control node is not higher than a specific level, the first PMOS transistor may not output the voltage of the first control node to the second control node. Therefore, the voltage level of the second control node may be controlled and the gate signal may rise in one step.

BRIEF DESCRIPTION OF THE DRAWINGS

The above and other aspects of some embodiments according to the present disclosure will become more apparent by describing in more detail aspects of some embodiments thereof with reference to the accompanying drawings, in which.

DETAILED DESCRIPTION

Hereinafter, aspects of some embodiments of the present disclosure will be described in more detail with reference to the accompanying drawings.

Figure 1:
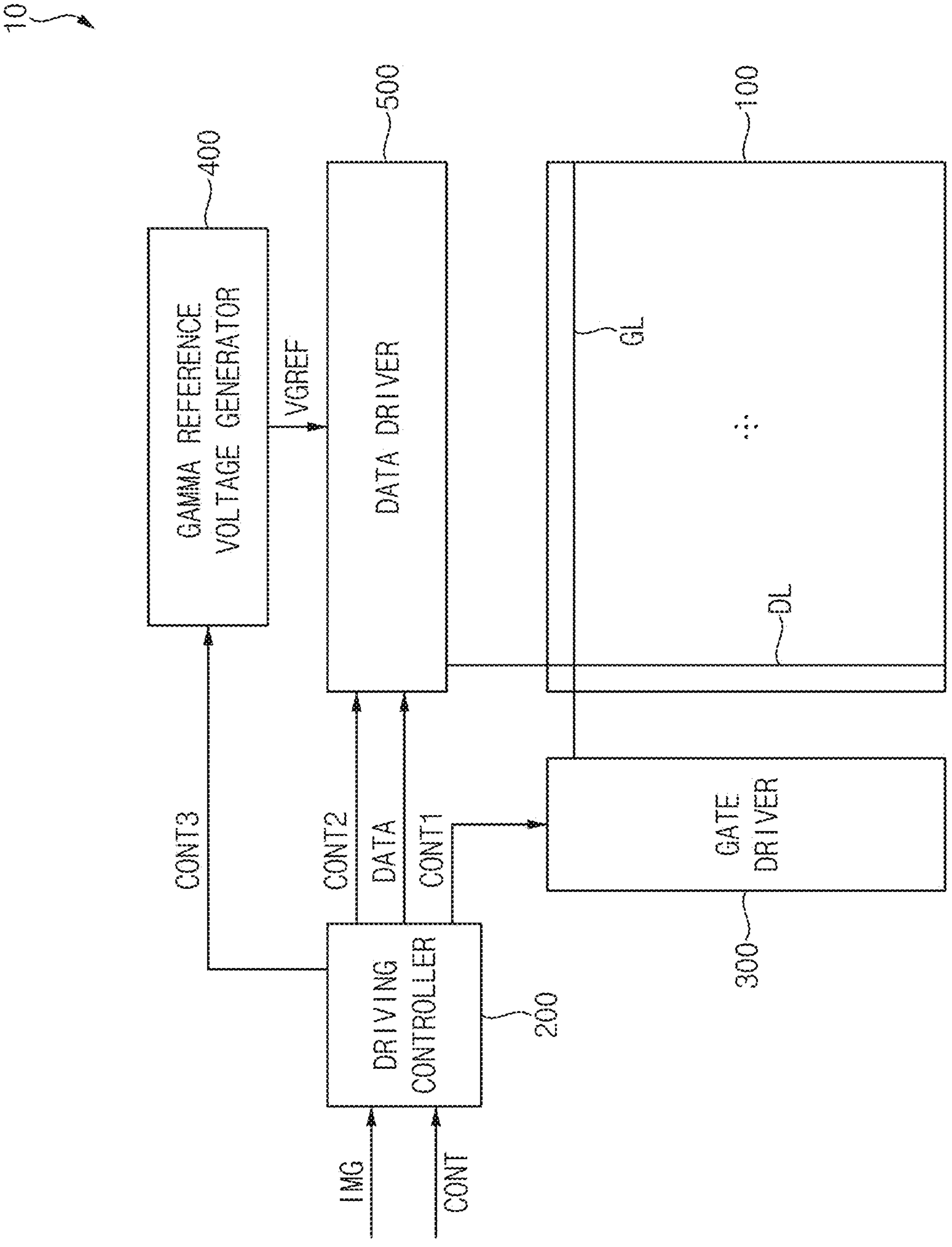
FIG. 1 is a block diagram illustrating a display device according to some embodiments of the present disclosure.

FIG. 1 is a block diagram illustrating a display device 10 according to embodiments of the present disclosure.

Referring to FIG. 1, a display device 10 may include a display panel 100 and a display panel driver. The display panel driver may include a driving controller 200, a gate driver 300, a gamma reference voltage generator 400, and a data driver 500.

The display panel 100 may include a display area for displaying images and a peripheral area located adjacent to (e.g., in a periphery or outside a footprint of) the display area.

The display panel 100 may include gate lines GL, data lines DL, pixels electrically connected to the gate lines GL and the data lines DL, respectively. The gate lines GL may extend in a first direction, and the data lines DL may extend in a second direction crossing (e.g., in a direction perpendicular to) the first direction.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

According to some embodiments, the gamma reference voltage generator 400 may be located in the driving controller 200 or may be located in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

FIGS. 2A to 2D is a block diagrams illustrating stages of a gate driver 300 of FIG. 1.

Figure 2A:
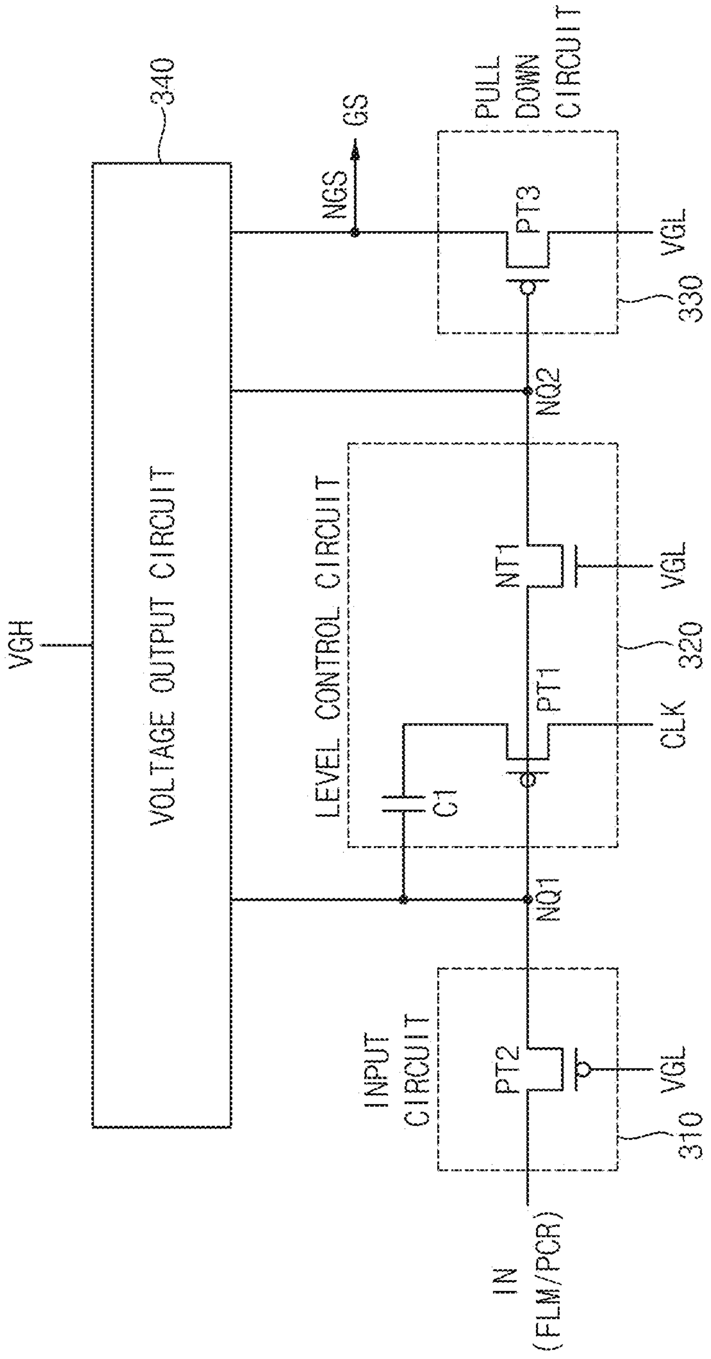
FIGS. 2A to 2D is a block diagrams illustrating stages of a gate driver of FIG. 1.
Figure 2B:
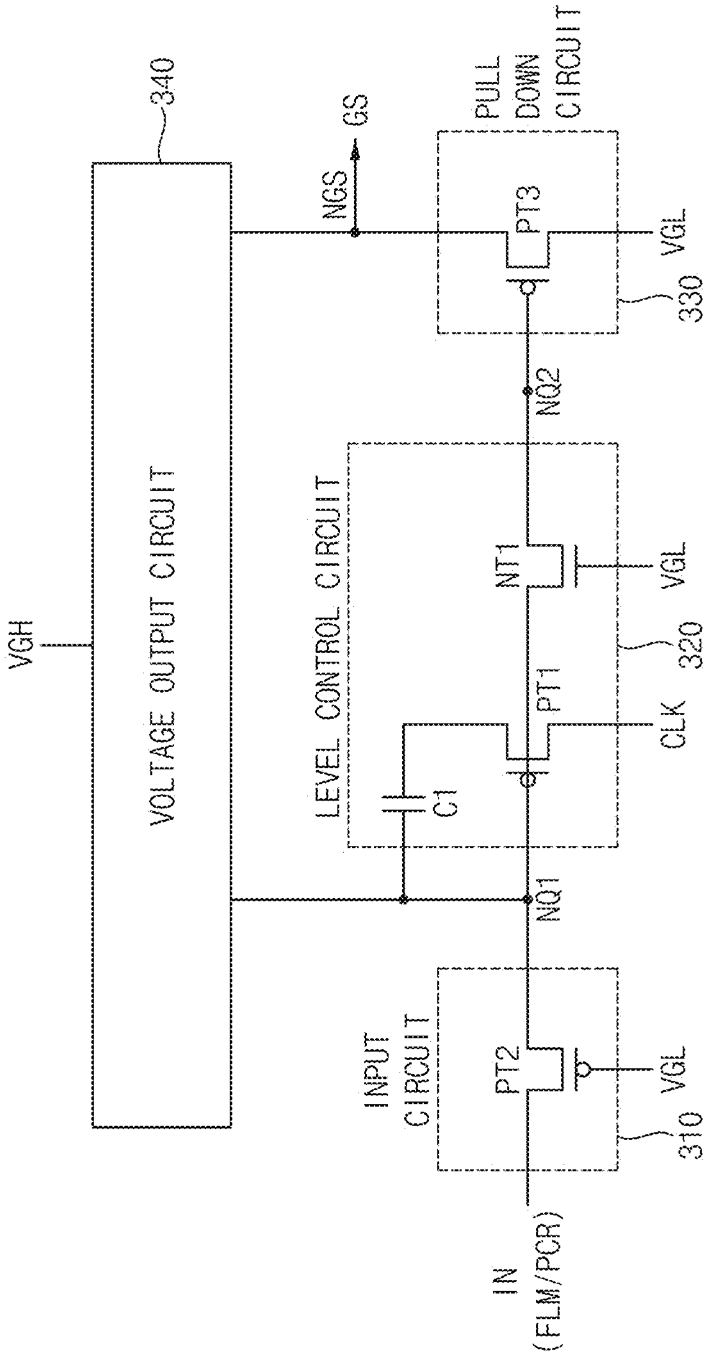
Figure 2C:
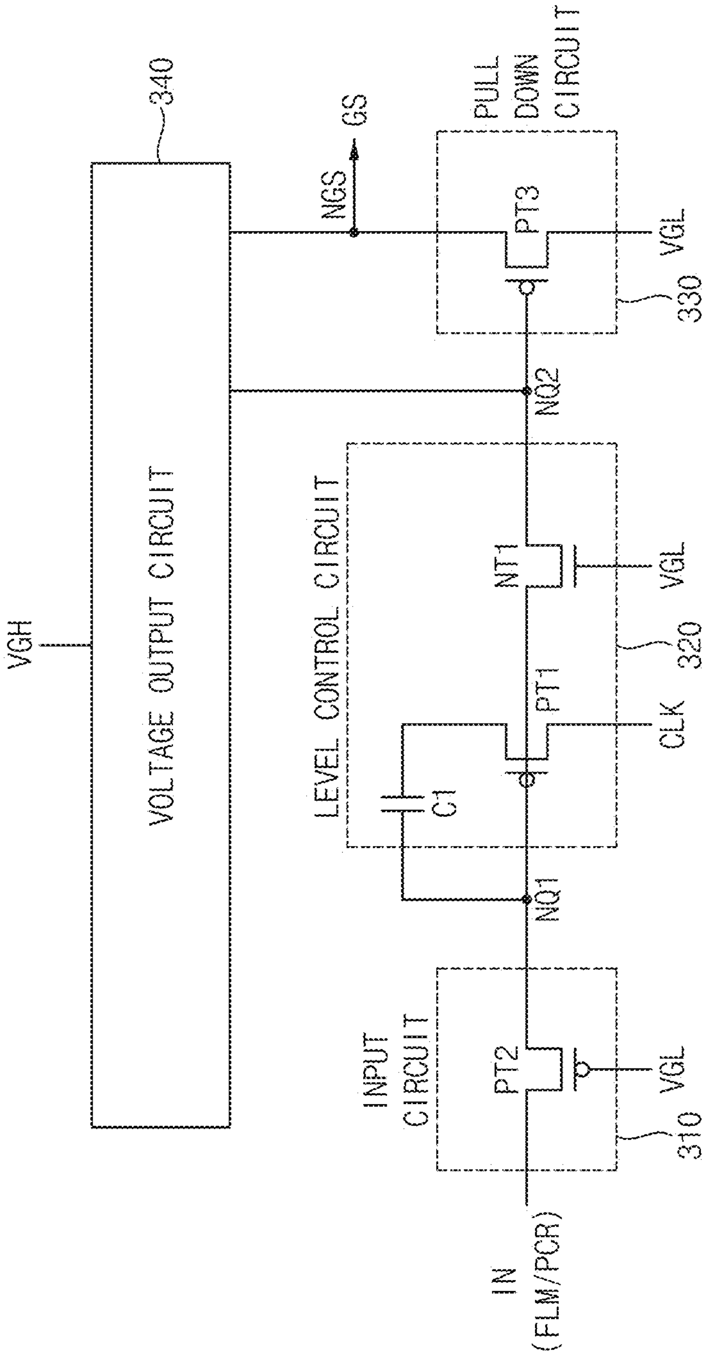
Figure 2D:
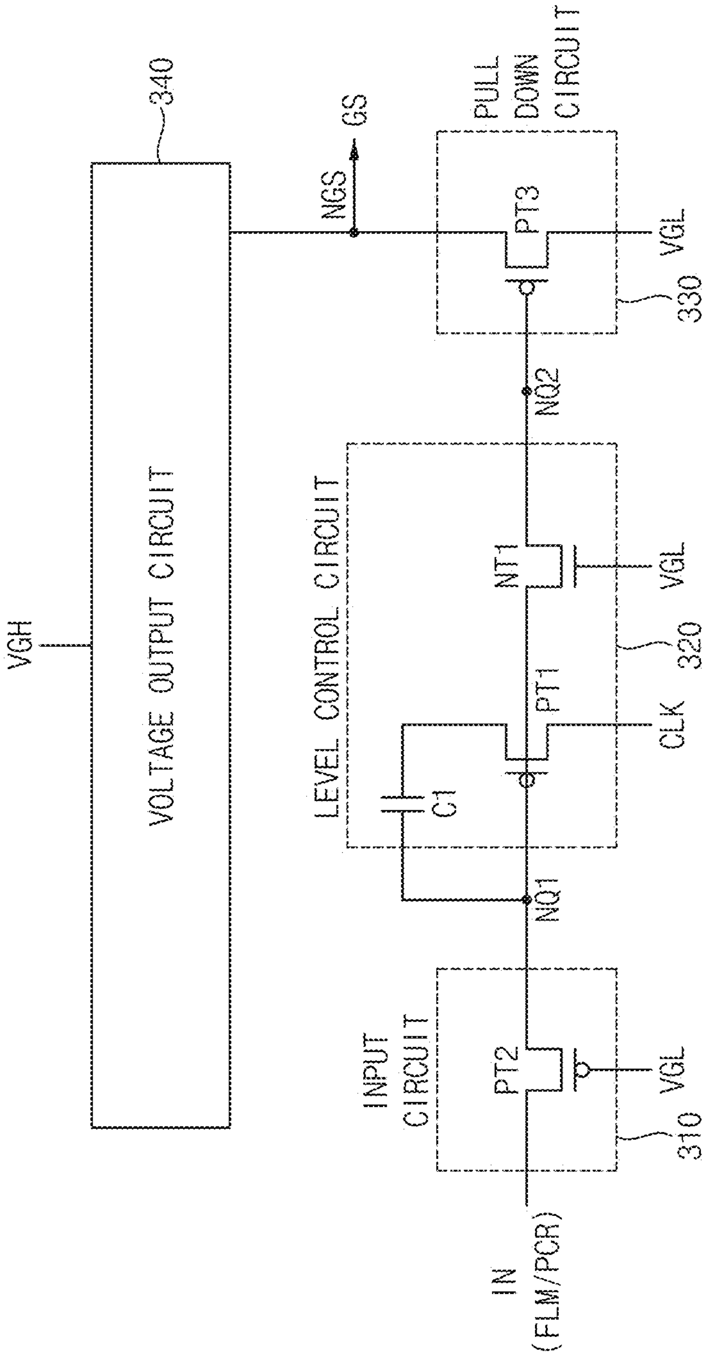

Referring to FIGS. 1 and 2D, each stage of a gate driver 300 may include an input circuit 310, a level control circuit 320, a pull down circuit 330, and a voltage output circuit 340.

The input circuit 310 may output an input signal IN to a first control node NQ1. The input signal IN may be a gate start signal FLM or a carry signal PCR of a previous stage. According to some embodiments, the input circuit 310 may include a second p-type metal-oxide-semiconductor (PMOS) transistor PT2. The second PMOS transistor PT2 may include a gate electrode receiving a low gate voltage VGL, a first electrode receiving the input signal IN, and a second electrode connected to the first control node NQ1. FIGS. 2A to 2D illustrate that the gate electrode of the second PMOS transistor PT2 receives the low gate voltage VGL, but embodiments according to the present disclosure are not limited thereto. For example, the gate electrode of the second PMOS transistor PT2 may receive an arbitrary clock signal.

The level control circuit 320 may be connected between the first control node NQ1 and a second control node NQ2 and control a voltage level of the second control node NQ2. The level control circuit 320 may include a first PMOS transistor PT1, a first capacitor C1, and a first n-type metal-oxide-semiconductor (NMOS) transistor NT1.

The first PMOS transistor PT1 may include a gate electrode connected to the first control node NQ1, a first electrode receiving a clock signal CLK, and a second electrode.

The first capacitor C1 may include a first electrode connected to the second electrode of the first PMOS transistor PT1 and a second electrode connected to the first control node NQ1. The first capacitor C1 may be a boosting capacitor which boosts a voltage of the first control node NQ1.

The first NMOS transistor NT1 may include a gate electrode receiving the low gate voltage VGL, a first electrode connected to the first control node NQ1, and a second electrode connected to the second control node NQ2.

The pull down circuit 330 may pull down a gate signal GS to the low gate voltage VGL in response to a voltage of the second control node NQ2, and output the gate signal GS to a gate output node NGS. According to some embodiments, the pull down circuit 330 may include a third PMOS transistor PT3. The third PMOS transistor PT3 may include a gate electrode connected to the second control node NQ2, a first electrode receiving the low gate voltage VGL, and a second electrode connected to the gate output node NGS.

The voltage output circuit 340 may be connected to the gate output node NGS or be connected to at least one of the first control node NQ1 and the second control node NQ2 and the gate output node NGS. For example, as shown in FIG. 2A, the voltage output circuit 340 may be connected to the first control node NQ1, the second control node NQ2, and the gate output node NGS. For example, as shown in FIG. 2B, the voltage output circuit 340 may be connected to the first control node NQ1 and the gate output node NGS. As shown in FIG. 2C, the voltage output circuit 340 may be connected to the second control node NQ2 and the gate output node NGS. As shown in FIG. 2D, the voltage output circuit 340 may be connected to the gate output node NGS.

The voltage output circuit 340 may output a high gate voltage VGH to at least one of the first control node NQ1, the second control node NQ2, and the gate output node (NGS).

Figure 3:
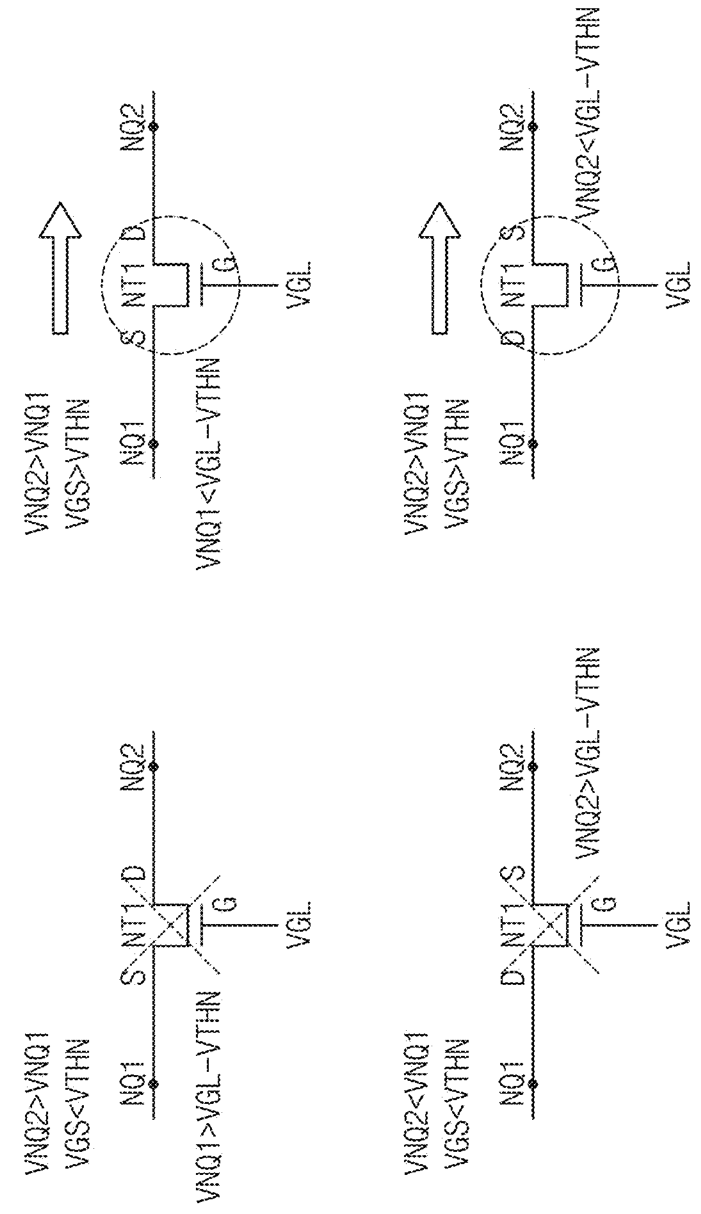
FIG. 3 is a conceptual diagram explaining an operation of a first NMOS transistor of a stage of FIGS. 2A to 2D.

FIG. 3 is a conceptual diagram explaining an operation of a first NMOS transistor NT1 of a stage of FIGS. 2A to 2D.

Referring to FIGS. 1 to 3, when a gate-source voltage of a first NMOS transistor NT1 is higher than a threshold voltage of the first NMOS transistor NT1, the first NMOS transistor NT1 may be turned on. On the other hand, when the gate-source voltage of the first NMOS transistor NT1 is lower than a threshold voltage VTHN of the first NMOS transistor NT1, the first NMOS transistor NT1 may be turned off.

A voltage of the gate electrode of the first NMOS transistor NT1 may be constant at a low gate voltage VGL. When a voltage VNQ2 of a second control node NQ2 is higher than a voltage VNQ1 of a first control node NQ1, a first electrode of the first NMOS transistor NT1 may be a source electrode, and a second electrode of the first NMOS transistor NT1 may be a drain electrode. Therefore, the first NMOS transistor NT1 may be turned on in response to a voltage VNQ1 of the first control node NQ1.

For example, when the voltage VNQ1 of the first control node NQ1 is lower than a voltage (VGL−VTHN) obtained by subtracting the threshold voltage VTHN of the first NMOS transistor NT1 from the low gate voltage VGL, the first NMOS transistor NT1 may be turned on. When it is lower, the first NMOS transistor NT1 may be turned on. For example, when the voltage VNQ1 of the first control node NQ1 is higher than a voltage (VGL−VTHN) obtained by subtracting the threshold voltage VTHN of the first NMOS transistor NT1 from the low gate voltage VGL, the first NMOS transistor NT1 may be turned off.

The voltage of the gate electrode of the first NMOS transistor NT1 may be constant at the low gate voltage VGL. When the voltage VNQ2 of the second control node NQ2 is lower than the voltage VNQ1 of the first control node NQ1, the first electrode of the first NMOS transistor NT1 may be the drain electrode. may be, and the second electrode of the first NMOS transistor NT1 may be the source electrode. Therefore, the first NMOS transistor NT1 may be turned on in response to the voltage VNQ2 of the second control node NQ2.

For example, when the voltage VNQ2 of the second control node NQ2 is lower than a voltage (VGL−VTHN) obtained by subtracting the threshold voltage VTHN of the first NMOS transistor NT1 from the low gate voltage VGL, the first NMOS transistor NT1 may be turned on. For example, when the voltage VNQ2 of the second control node NQ2 is higher than a voltage (VGL−VTHN) obtained by subtracting the threshold voltage VTHN of the first NMOS transistor NT1 from the low gate voltage VGL, the first NMOS transistor NT1 may be turned off.

Figure 4:
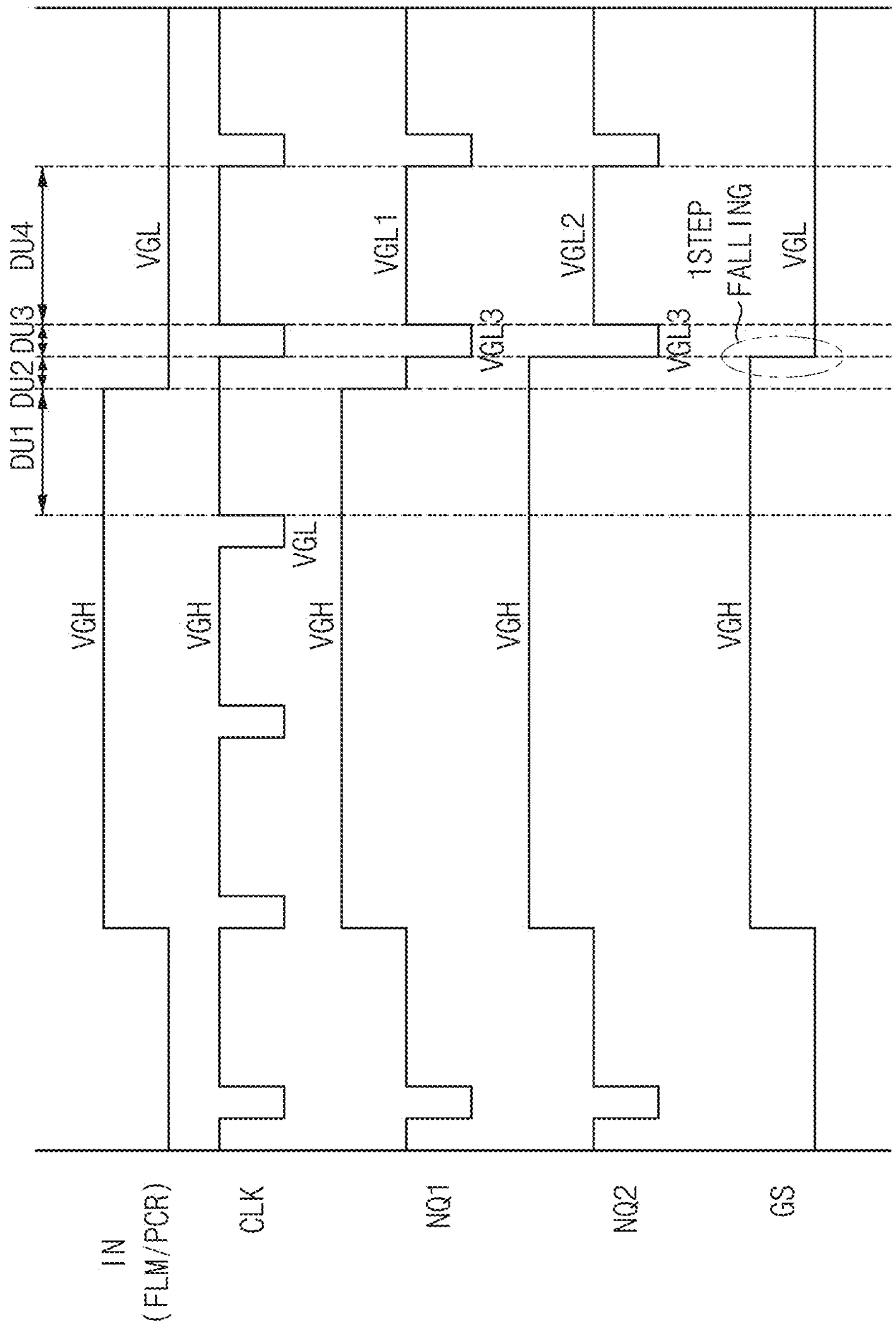
FIG. 4 is a timing diagram illustrating an example of an operation of a stage of FIGS. 2A to 2D.

FIG. 4 is a timing diagram illustrating an example of an operation of a stage of FIGS. 2A to 2D according to some embodiments of the present disclosure.

Referring to FIGS. 1 to 4, in a first duration DU1, an input signal IN may have a high gate voltage VGH and a clock signal CLK may have the high gate voltage VGH.

In the first duration DU1, the input circuit 310 may output the input signal IN having the high gate voltage VGH to a first control node NQ1. The first control node NQ1 may have the high gate voltage VGH. The first PMOS transistor may be turned off in response to the voltage VNQ1 of the first control node NQ1 having the high gate voltage VGH.

In the first duration DU1, since the voltage VNQ1 of the first control node NQ1 is higher than a voltage (VGL−VTHN) obtained by subtracting the threshold voltage VTHN of the first NMOS transistor NT1 from a low gate voltage VGL, the first NMOS transistor NT1 may be turned off. Therefore, a second control node NQ2 may have the high gate voltage VGH. The low gate voltage VGL may be lower than the high gate voltage VGH.

In a second duration DU2 after the first duration DU1, the input signal IN may have the low gate voltage VGL, and the clock signal CLK may have the high gate voltage VGH.

In the second duration DU2, the input circuit 310 may receive the input signal IN having the low gate voltage VGL and output a first low gate voltage VGL1 to the first control node NQ1. The first control node NQ1 may have the first low gate voltage VGL1. The first low gate voltage VGL1 may be higher than the low gate voltage VGL by an amount equal to a threshold voltage of a PMOS transistor of the input circuit 310. The first low gate voltage VGL1 may be lower than the high gate voltage VGH and higher than the low gate voltage VGL. The first PMOS transistor PT1 may be turned on in response to the voltage VNQ1 of the first control node NQ1 having the first low gate voltage VGL1.

In the second duration DU2, since the voltage VNQ1 of the first control node NQ1 is the first low gate voltage VGL1 higher than the low gate voltage VGL, the voltage VNQ1 of the first control node NQ1 may be higher than the voltage (VGL−VTHN) obtained by subtracting the threshold voltage VTHN of the first NMOS transistor NT1 from the low gate voltage VGL. Therefore, the first NMOS transistor NT1 may be turned off. Accordingly, the second control node NQ2 may have the high gate voltage VGH.

In a third duration DU3 after the second duration DU2, the clock signal CLK may have the low gate voltage VGL.

At a starting point of the third duration DU3, the first PMOS transistor PT1 may be turned in response to the voltage VNQ1 of the first control node NQ1 having the first low gate voltage VGL1.

At the starting point of the third duration DU3, a voltage level of the clock signal CLK may fall from the high gate voltage VGH to the low gate voltage VGL. Therefore, the voltage VNQ1 of the first control node NQ1 may be boosted by the first capacitor C1 by a difference between the high gate voltage VGH and the low gate voltage VGL, and the voltage VNQ1 of the first control node NQ1 may be the third low gate voltage VGL3. That is, the third low gate voltage VGL3 may be a voltage falling from the first low gate voltage VGL1 by the difference between the high gate voltage VGH and the low gate voltage VGL. The third low gate voltage VGL3 may be lower than the high gate voltage VGH, the first low gate voltage VGL1, and the low gate voltage VGL.

In the third duration DU3, the voltage VNQ1 of the first control node NQ1 may be the third low gate voltage VGL3, and the voltage VNQ1 of the first control node NQ1 may be lower than the voltage (VGL−VTHN) obtained by subtracting the threshold voltage VTHN of the first NMOS transistor NT1 from the low gate voltage VGL. Therefore, the first NMOS transistor NT1 may be turned on. Accordingly, the second control node NQ2 may have the third low gate voltage VGL3.

In a fourth duration DU4 after the third duration DU3, the clock signal CLK may have the high gate voltage VGH.

At a starting point of the fourth duration DU4, the first PMOS transistor PT1 may be turned in response to the voltage VNQ1 of the first control node NQ1 having the third low gate voltage VGL3.

At the starting point of the fourth duration DU4, the voltage level of the clock signal CLK may rise from the low gate voltage VGL to the high gate voltage VGH. Therefore, the voltage VNQ1 of the first control node NQ1 may be boosted by the first capacitor C1 by the difference between the high gate voltage VGH and the low gate voltage VGL, and the voltage VNQ1 of the first control node NQ1 may be the first low gate voltage VGL1. That is, the first low gate voltage VGL1 may be a voltage rising from the third low gate voltage VGL3 by the difference between the high gate voltage VGH and the low gate voltage VGL.

In the fourth duration DU4, the voltage VNQ1 of the first control node NQ1 may be the first low gate voltage VGL1, and the voltage VNQ2 of the second control node NQ2 may be lower than the voltage (VGL−VTHN) obtained by subtracting the threshold voltage VTHN of the first NMOS transistor NT1 from the low gate voltage VGL. Therefore, the first NMOS transistor NT1 may be turned on. Accordingly, the second control node NQ2 may have a second low gate voltage VGL2. The second low gate voltage VGL2 may be a voltage falling the threshold voltage VTHN of the first NMOS transistor NT1 from the low gate voltage VGL. The second low gate voltage VGL2 may be lower than the high gate voltage VGH, the first low gate voltage VGL1, and the low gate voltage VGL, and be higher than the third low gate voltage VGL3.

The third PMOS transistor PT3 may pull down a gate signal GS to the low gate voltage VGL. The gate signal GS may have a voltage higher than the low gate voltage VGL during the first duration DU1 and have the low gate voltage VGL during the second duration DU2 and the third duration DU3.

The third PMOS transistor PT3 may be turned on in response to the voltage VNQ2 of the second control node NQ2. When the voltage VNQ2 of the second control node NQ2 has a high level, the third PMOS transistor PT3 may be turned off. When the voltage VNQ2 of the second control node NQ2 has a low level, the third PMOS transistor PT3 may be turned on. The high gate voltage VGH may have the high level. The first low gate voltage VGL1, the low gate voltage VGL, the second low gate voltage VGL2, and the third low gate voltage VGL3 may have the low level.

In order for the third PMOS transistor PT3 to be sufficiently turned on, the voltage VNQ2 of the second control node NQ2 should be lower than the low gate voltage VGL. When the voltage VNQ2 of the second control node NQ2 is higher than the low gate voltage VGL, the third PMOS transistor PT3 may not be sufficiently turned on.

The first control node NQ1 may have the high gate voltage VGH which has the high level in the first duration DU1 and have the first low gate voltage VGHL1 higher than the low gate voltage VGL in the second duration DU2, and have the third low gate voltage VGL3 lower than the low gate voltage VGL in the third duration DU3.

The second control node NQ2 may have the high gate voltage VGH which has the high level in the first duration DU1 and the second duration DU2, and have the third low gate voltage VGL3 lower the low gate voltage VGL in the third duration DU3.

When a stage of a gate driver 300 does not include a level control circuit 320, the third PMOS transistor PT3 may be turned on in response to the voltage VNQ1 of the first control node NQ1. In this case, the third PMOS transistor PT3 may not be sufficiently turned on in the second duration DU2 and may be sufficiently turned on in the third duration DU3. Therefore, the gate signal GS may fall in two steps. Accordingly, a horizontal lines may be visible on a display device 10.

On the other hand, when the stage of the gate driver 300 includes the level control circuit 320, the third PMOS transistor PT3 may be turned on in response to the voltage VNQ2 of the second control node NQ2. In this case, the third PMOS transistor PT3 may be sufficiently turned on in the second duration DU2 and the third duration DU3. Therefore, as shown in FIG. 4, the gate signal GS may fall in one step. Accordingly, the horizontal line may not be visible on the display device 10.

As such, the stage of the gate driver 300 may include the first PMOS transistor PT1, the first capacitor C1, and the first NMOS transistor NT1, and the voltage VNQ1 of the first control node NQ1 may be boosted by the first capacitor C1. When the voltage VNQ1 of the first control node NQ1 is not lower than a specific level, the first NMOS transistor NT1 may not output the voltage VNQ1 of the first control node NQ1 to the second control node NQ2. Therefore, a voltage level of the second control node NQ2 may be controlled, and the gate signal GS may fall in one step.

Figure 5:
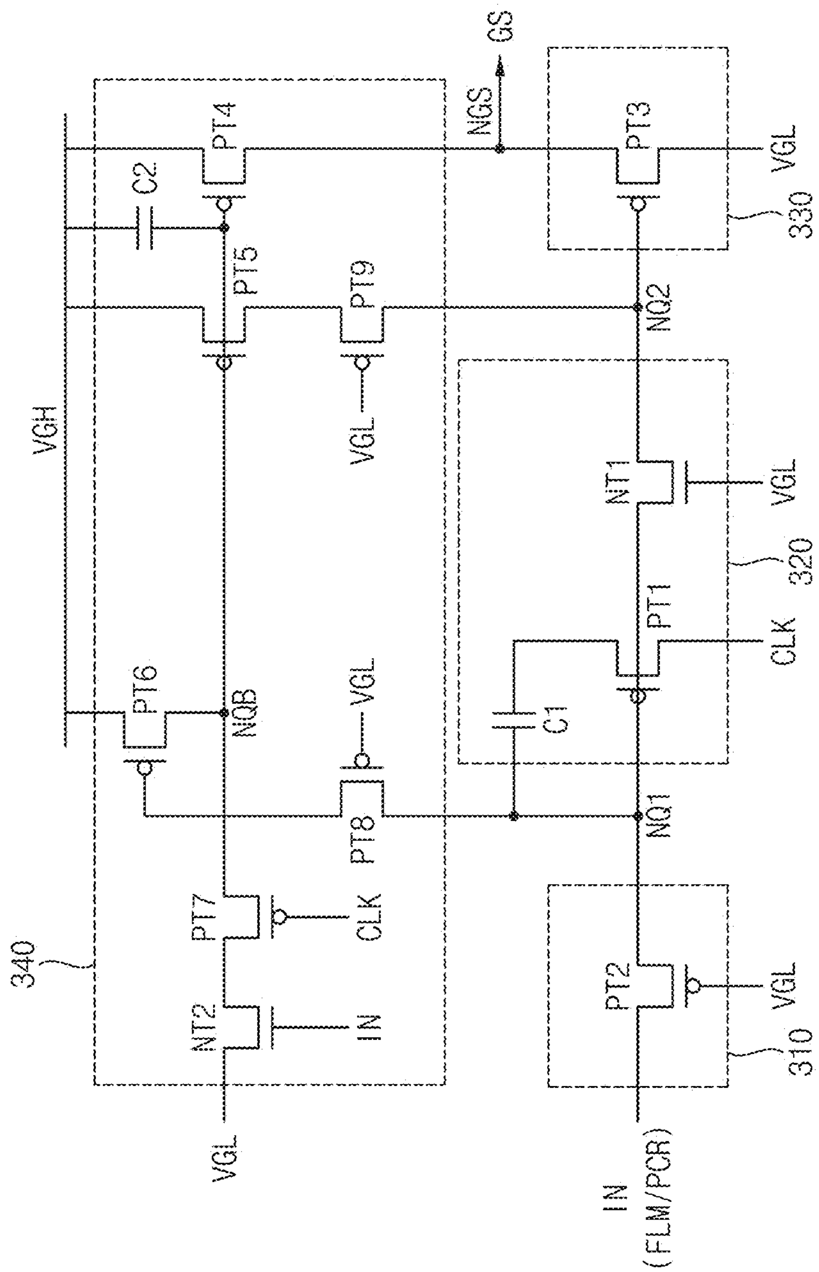
FIG. 5 is a circuit diagram illustrating an example of a stage of FIG. 2A.

FIG. 5 is a circuit diagram illustrating an example of a stage of FIG. 2A. Although FIG. 5 illustrates various components in a stage according to some embodiments of the present disclosure, embodiments according to the present disclosure are not limited thereto, and according to some embodiments, the stage may include additional components or fewer components without departing from the spirit and scope of embodiments according to the present disclosure.

A stage in FIG. 5 is an example of a stage in FIG. 2A, and a configuration of the stage of FIG. 2A is not limited to a configuration of the stage of FIG. 5. Therefore, stages of FIGS. 2B to 2D may be substantially equal to the stages of FIG. 2A except for a connection relationship. Accordingly, overlapping descriptions will be omitted.

Referring to FIGS. 1 to 5, a stage of a gate driver 300 may include an input circuit 310, a level control circuit 320, a pull down circuit 330, and a voltage output circuit 340.

The input circuit 310 may include a second PMOS transistor PT2.

The second PMOS transistor PT2 may include a gate electrode receiving a low gate voltage VGL, a first electrode receiving an input signal IN, and a second electrode connected to a first control node NQ1. Since the gate electrode of the second PMOS transistor PT2 receives the low gate voltage VGL, the second PMOS transistor PT2 may be an Always-On Transistor (AOT).

The level control circuit 320 may include a first PMOS transistor PT1, a first capacitor C1, and a first NMOS transistor NT1.

The first PMOS transistor PT1 may include a gate electrode connected to the first control node NQ1, a first electrode receiving a clock signal CLK, and a second electrode. The first PMOS transistor PT1 may be turned on in response to a voltage VNQ1 of the first control node NQ1.

The first capacitor C1 may include the first electrode connected to the second electrode of the first PMOS transistor PT1 and a second electrode connected to the first control node NQ1. The first capacitor C1 may be a boosting capacitor which boosts the voltage VNQ1 of the first control node NQ1.

The first NMOS transistor NT1 may have a gate electrode receiving the low gate voltage VGL, a first electrode connected to the first control node NQ1, and a second electrode connected to a second control node NQ2. The gate electrode of the first NMOS transistor NT1 may receive the low gate voltage VGL. Therefore, the first NMOS transistor NT1 may be turned on in response to the voltage VNQ1 of the first control node NQ1 and the voltage VNQ2 of the second control node NQ2.

The pull down circuit 330 may include a third PMOS transistor PT3.

The third PMOS transistor PT3 includes a gate electrode connected to the second control node NQ2, a first electrode receiving the low gate voltage VGL, and a second electrode connected to a gate output node NGS. The third PMOS transistor PT3 may be turned on in response to the voltage VNQ2 of the second control node NQ2.

The voltage output circuit 340 may include a fourth PMOS transistor PT4, a fifth PMOS transistor PT5, a sixth PMOS transistor PT6, a seventh PMOS transistor PT7, an eighth PMOS transistor PT8, and a ninth PMOS transistor PT8, a ninth PMOS transistor PT9, a second NMOS transistor NT2, and a second capacitor (C2).

The fourth PMOS transistor PT4 may include a gate electrode connected to an inverting control node NQB, a first electrode receiving a high gate voltage VGH, and a second electrode connected to the gate output node NGS. The fourth PMOS transistor PT4 may be turned on in response to a voltage of the inverting control node NQB.

The fifth PMOS transistor PT5 may include a gate electrode connected to the inverting control node NQB, a first electrode receiving the high gate voltage VGH, and a second electrode. The fifth PMOS transistor PT5 may be turned on in response to the voltage of the inverting control node NQB.

The sixth PMOS transistor PT6 may include a gate electrode, a first electrode receiving the high gate voltage VGH, and a second electrode connected to the inverting control node NQB. The sixth PMOS transistor PT6 may be turned on in response to the voltage of the second electrode of the eighth PMOS transistor PT8.

The seventh PMOS transistor PT7 may include a gate electrode receiving the clock signal CLK, a first electrode, and a second electrode connected to the inverting control node NQB. The seventh PMOS transistor PT7 may be turned on in response to the clock signal CLK.

The eighth PMOS transistor PT8 may include a gate electrode receiving the low gate voltage VGL, a first electrode connected to the first control node NQ1, and the second electrode connected to the gate electrode of the sixth PMOS transistor PT6. Since the gate electrode of the eighth PMOS transistor PT8 receives the low gate voltage VGL, the eighth PMOS transistor PT8 may be the always-on transistor.

The ninth PMOS transistor PT9 may include a gate electrode receiving the low gate voltage VGL, a first electrode connected to the second electrode of the fifth PMOS transistor PT5, and a second electrode connected to the second control node NQ2. The gate electrode of the ninth PMOS transistor PT9 receives the low gate voltage VGL, the ninth PMOS transistor PT9 may be the always-on transistor.

The second NMOS transistor NT2 mat include gate electrode receiving the input signal IN, a first electrode receiving the low gate voltage VGL, and a first electrode receiving the low gate voltage VGL, and a second electrode connected to the first electrode of the seventh PMOS transistor PT7. The second NMOS transistor NT2 may be turned on in response to the input signal IN.

The second capacitor C2 may include a first electrode receiving the high gate voltage VGH and a second electrode connected to the inverting control node NQB. The second capacitor C2 may be a holding capacitor which holds a voltage of the inverting control node NQB.

Figure 6:
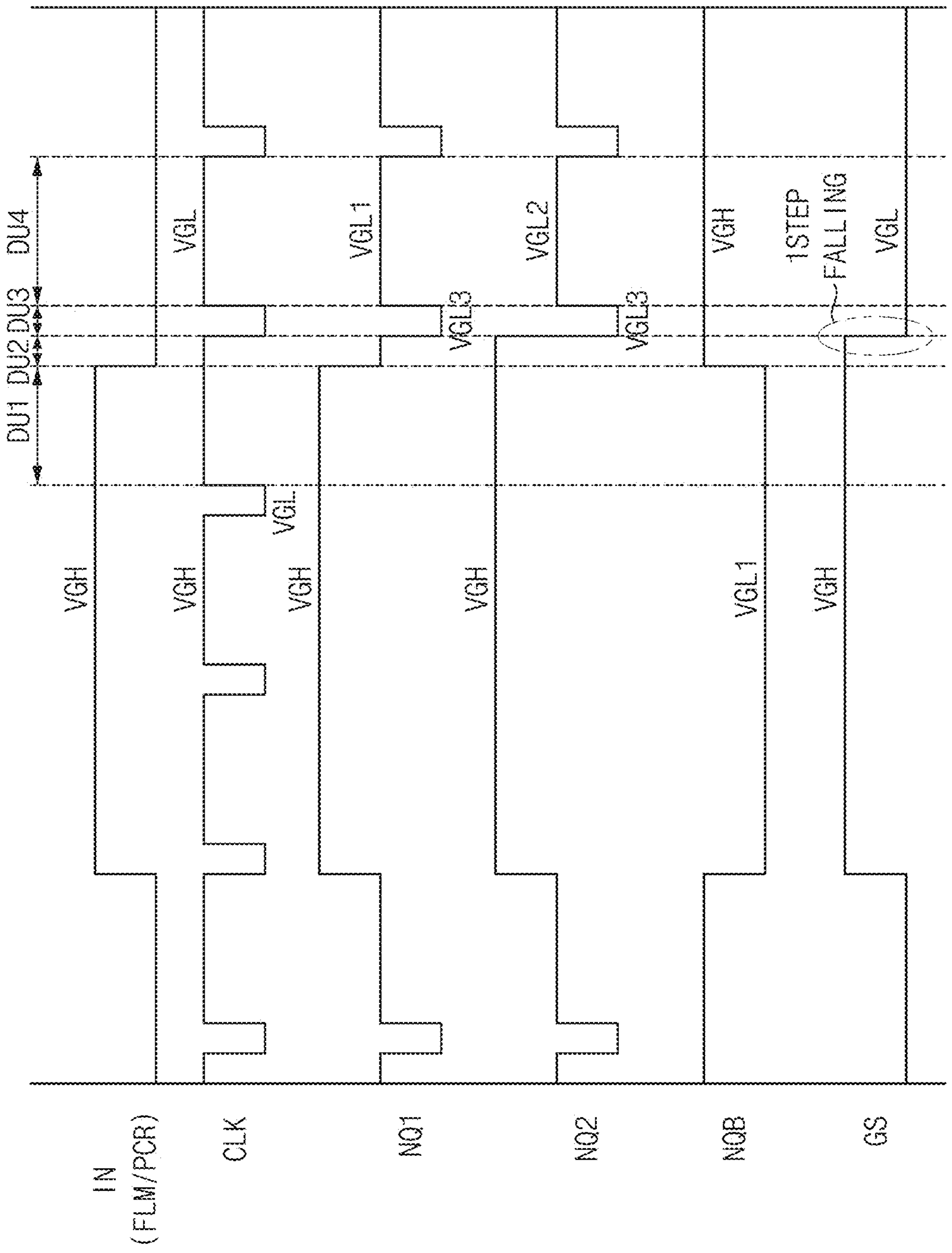
FIG. 6 is a timing diagram explaining an example of an operation of a stage of FIG. 5.

FIG. 6 is a timing diagram explaining an example of an operation of a stage of FIG. 5.

Referring to FIGS. 1 to 6, a second PMOS transistor PT2 may output an input signal IN to a first control node NQ1.

Since an eighth PMOS transistor PT8 is an always-on transistor, a sixth PMOS transistor PT6 is turned on in response to a voltage VNQ1 of a first control node NQ1 to output a high gate voltage VGH to the inverting control node NQB. Additionally, a second NMOS transistor NT2 may be turned on in response to an input signal IN.

Therefore, when the input signal IN has the high gate voltage VGH, the voltage VNQ1 of the first control node NQ1 may have a high level, the sixth PMOS transistor PT6 may be turned off in response to the voltage VNQ1 of the first control node NQ1 which has the high level, the second NMOS transistor NT2 may be turned on in response to the input signal IN having the high gate voltage VGH to output the low gate voltage VGL, and the inverting control node NQB may have a first low gate voltage VGL1 which is as high as a threshold voltage of a seventh PMOS transistor PT7 from the low gate voltage VGL.

In contrast, when the input signal IN has the low gate voltage VGL, the voltage VNQ1 of the first control node NQ1 may have a low level, the sixth PMOS transistor PT6 may be turned on in response to the voltage VNQ1 of the first control node NQ1 which has the low level to output the high gate voltage VGH to the inverting control node NQB, the second The NMOS transistor NT2 may be turned off in response to the input signal IN having the low gate voltage VGL, and the inverting control node NQB may have the high gate voltage VGH.

Accordingly, when the voltage VNQ1 of the first control node NQ1 is at the high level, the voltage of the inverting control node NQB may be at the low level. On the other hand, when the voltage VNQ1 of the first control node NQ1 is at the low level, the voltage of the inverting control node NQB may be at the high level.

A fifth PMOS transistor PT5 may be turned on in response to a voltage of the inverting control node NQB. In addition, since a ninth PMOS transistor PT9 is the always-on transistor, the fifth PMOS transistor PT5 may be turned on in response to the voltage of the inverting control node NQB to output the high gate voltage VGH to the second control node NQ2.

Therefore, when the voltage of the inverting control node NQB has the low level, the voltage VNQ2 of the second control node NQ2 may have the high level.

A fourth PMOS transistor PT4 may be turned on in response to the voltage of the inverting control node NQB. When the inverting control node NQB has the first low gate voltage VGL1, the fourth PMOS transistor PT4 may output the high gate voltage VGH to the gate output node NGS.

Operations of an input circuit 310, a level control circuit 320, and a pull down circuit 330 in the first to fourth durations DU1, . . . , DU4 are substantially equal to those described in FIG. 7, such that overlapping descriptions will be omitted.

FIGS. 7A to 7D are block diagrams illustrating a stage of a gate driver of FIG. 1.

Referring to FIGS. 1 to 7D, a stage of a gate driver 300 may include an input circuit 310', a level control circuit 320', a pull up circuit 330', and a voltage output circuit 340'.

The input circuit 310' may output an input signal IN' to a first control node NQ1'. The input signal IN' may have a gate start signal FLM' or a carry signal PCR' of a previous stage. According to some embodiments, the input circuit 310 may include a second NMOS transistor NT2. The second NMOS transistor NT2' may have a gate electrode receiving a high gate voltage VGH, a first electrode receiving the input signal IN', and a second electrode connected to the first control node NQ1'. FIGS. 7A to 7D illustrate that the gate electrode of the second NMOS transistor NT2 receives a high gate voltage VGH, but embodiments according to the present disclosure are not limited thereto. For example, the gate electrode of the second NMOS transistor NT2 may receive an arbitrary clock signal.

The level control circuit 320' may be connected between the first control node NQ1' and a second control node NQ2' and may control a voltage level of the second control node NQ2'. The level control circuit 320' may include a first NMOS transistor NT1', a first capacitor C1', and a first PMOS transistor PT1'.

The first NMOS transistor NT1' may include a gate electrode connected to the first control node NQ1', a first electrode receiving a clock signal CLK', and a second electrode.

The first capacitor C1' may include a first electrode connected to the second electrode of the first NMOS transistor NT1' and a second electrode connected to the first control node NQ1'. The first capacitor C1' may be a boosting capacitor which boosts a voltage of the first control node NQ1'.

The first PMOS transistor PT1 may have a gate electrode receiving the high gate voltage VGH, a first electrode connected to the first control node NQ1', and a second electrode connected to a second control node NQ2'.

The pull up circuit 330' may pull up a gate signal GS' to the high gate voltage VGH in response to a voltage of the second control node NQ2', and may output the gate signal GS' to the gate output node NGS'. According to some embodiments, the pull up circuit 330' may include a third NMOS transistor NT3'. The third NMOS transistor NT3' may include a gate electrode connected to the second control node NQ2', a first electrode receiving the high gate voltage VGH, and a second electrode connected to the gate output node NGS'.

Figure 7A:
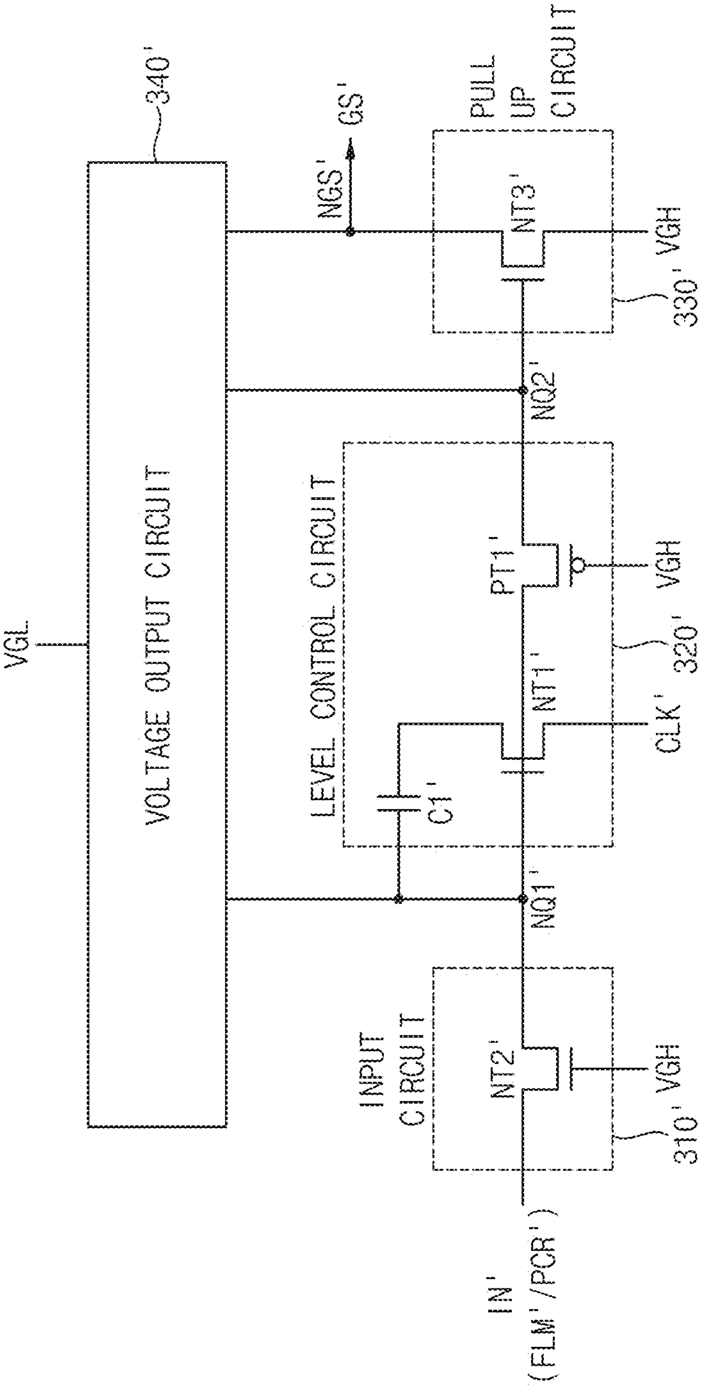
FIGS. 7A to 7D are block diagrams illustrating a stage of a gate driver of FIG. 1.
Figure 7B:
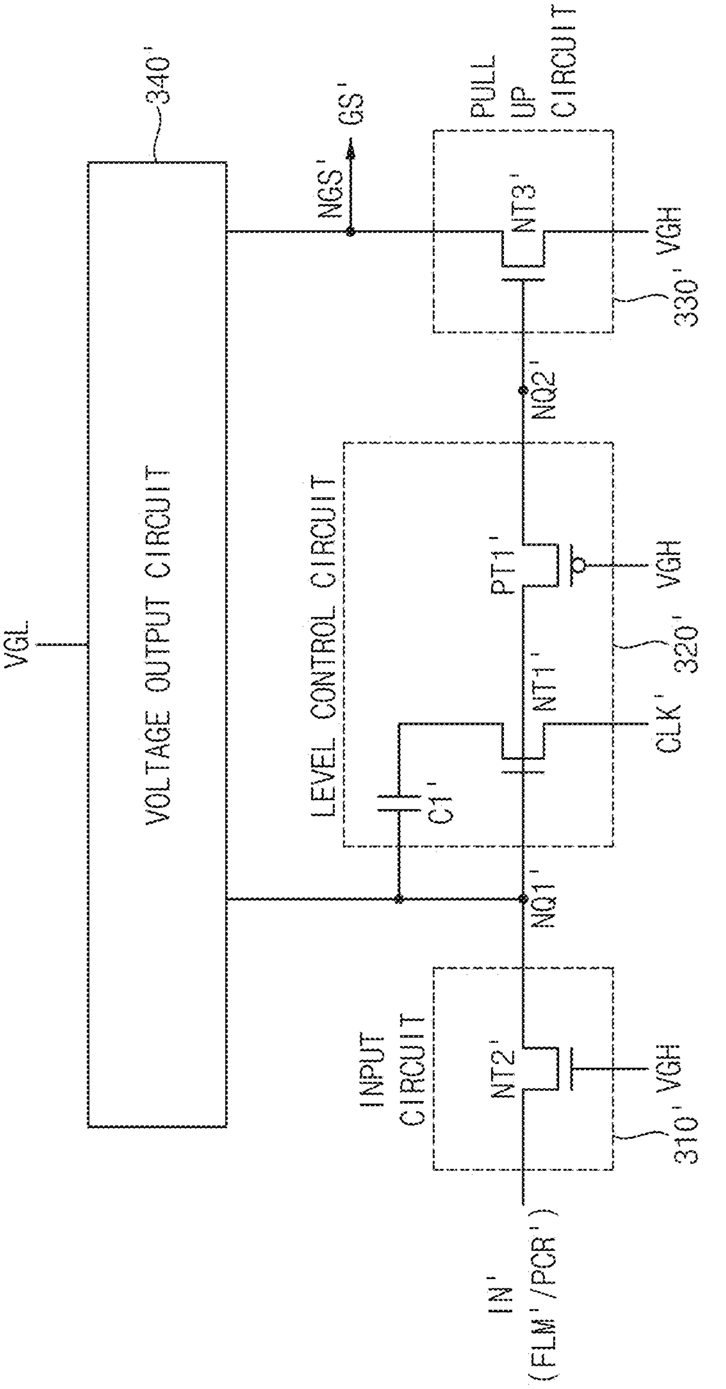
Figure 7C:
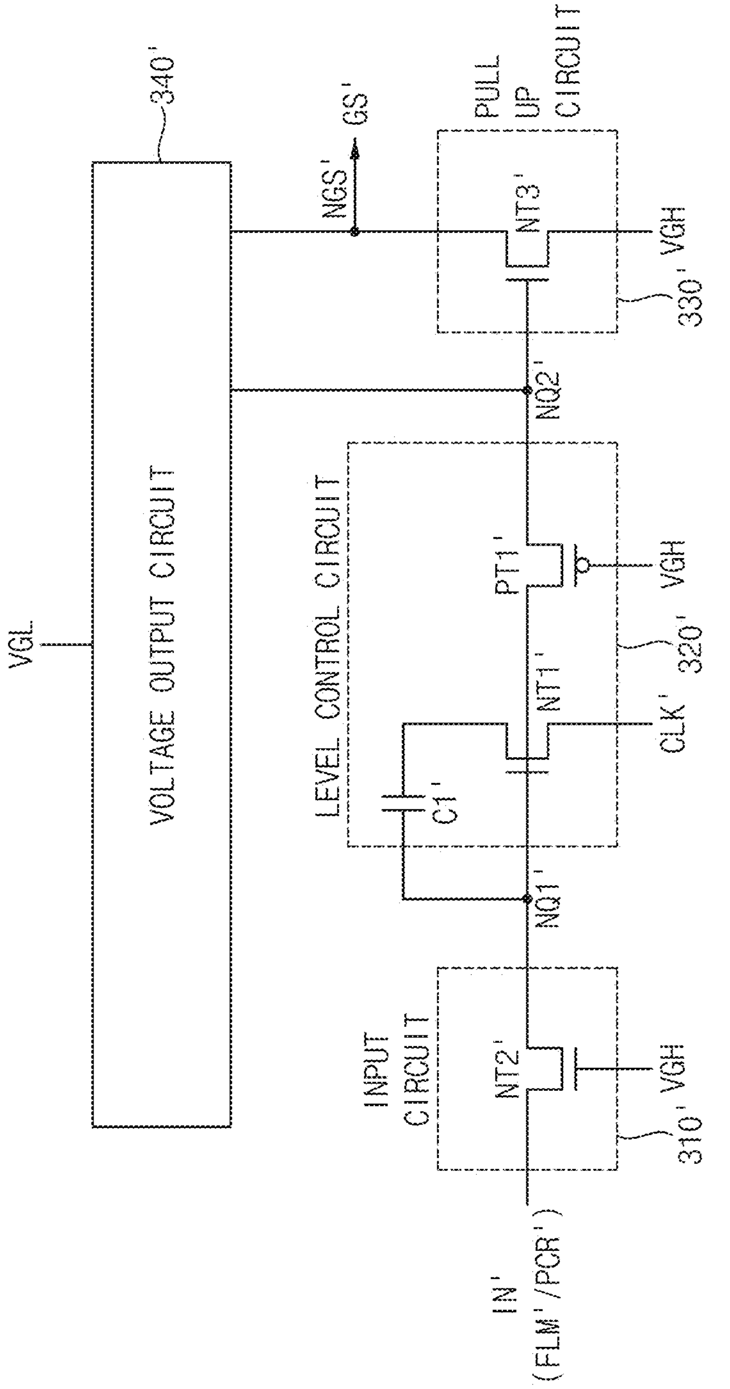
Figure 7D:
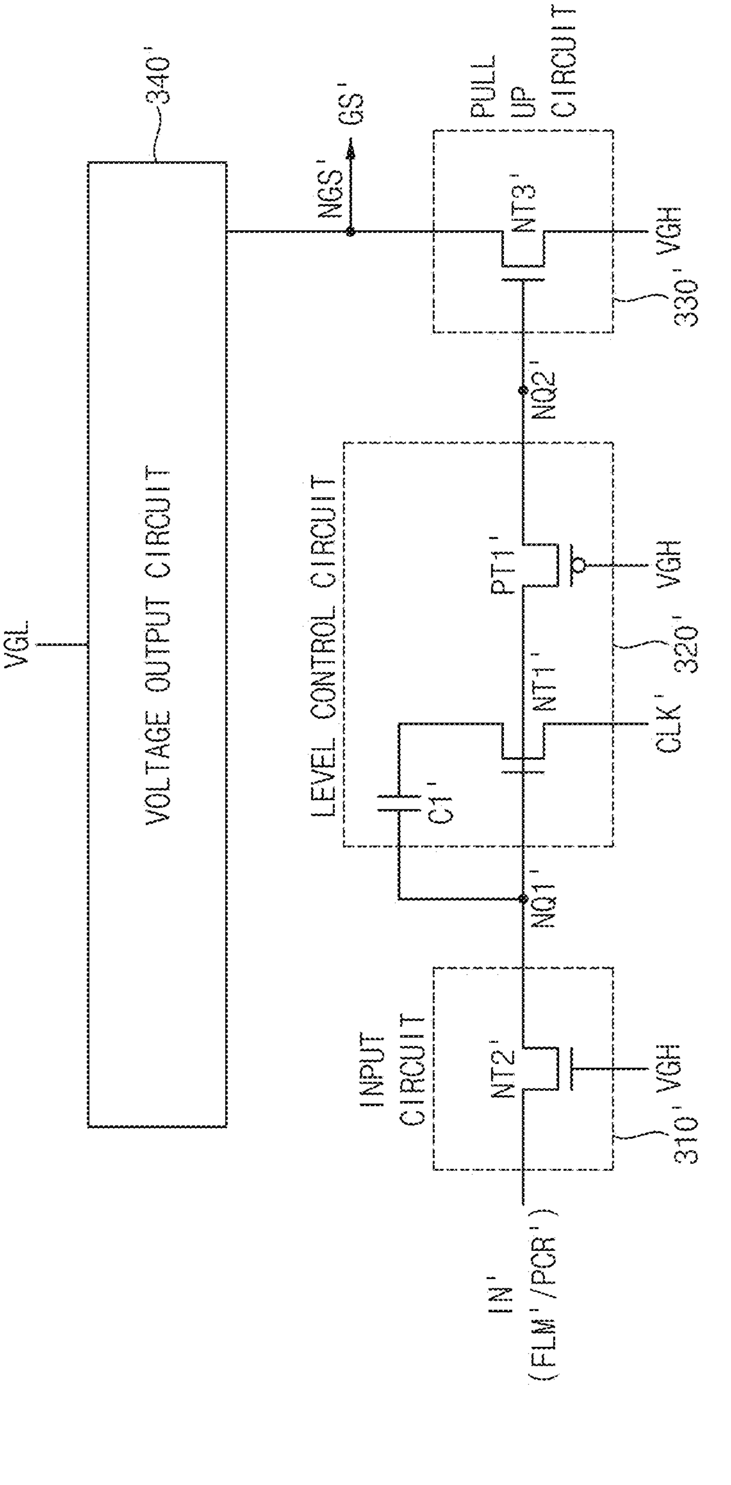

The voltage output circuit 340' may be connected to the gate output node NGS' or be connected to at least one of the first control node NQ1' and the second control node NQ2' and the gate output node NGS'. For example, as shown in FIG. 7A, the voltage output circuit 340' may be connected to the first control node NQ1', the second control node NQ2', and the gate output node NGS'. For example, as shown in FIG. 7B, the voltage output circuit 340' may be connected to the first control node NQ1' and the gate output node NGS'. As shown in FIG. 7C, the voltage output circuit 340' may be connected to the second control node NQ2' and the gate output node NGS'. As shown in FIG. 7D, the voltage output circuit 340' may be connected to the gate output node NGS'.

The voltage output circuit 340' may output a low gate voltage VGL to at least one of the first control node NQ1', the second control node NQ2', and the gate output node NGS'.

As such, the stage of the gate driver 300 may include the first NMOS transistor NT1', the first capacitor C1', and the first PMOS transistor PT1', and the voltage of the first control node NQ1' may be boosted by the first capacitor C1. When the voltage of the first control node NQ1' is not higher than a specific level, the first PMOS transistor PT1' may not output the voltage of the first control node NQ1' to the second control node NQ2'. Therefore, a voltage level of the second control node NQ2' may be controlled, and the gate signal GS' may rise in one step.

Except that a configuration of stages of FIGS. 7A to 7D is complementary to a configuration of stages of FIGS. 2A to 2D, an operation of the stages of FIGS. 7A to 7D may be substantially equal to the operation of the stages in FIGS. 2A to 2D. Therefore, redundant descriptions are omitted.

Figure 8:
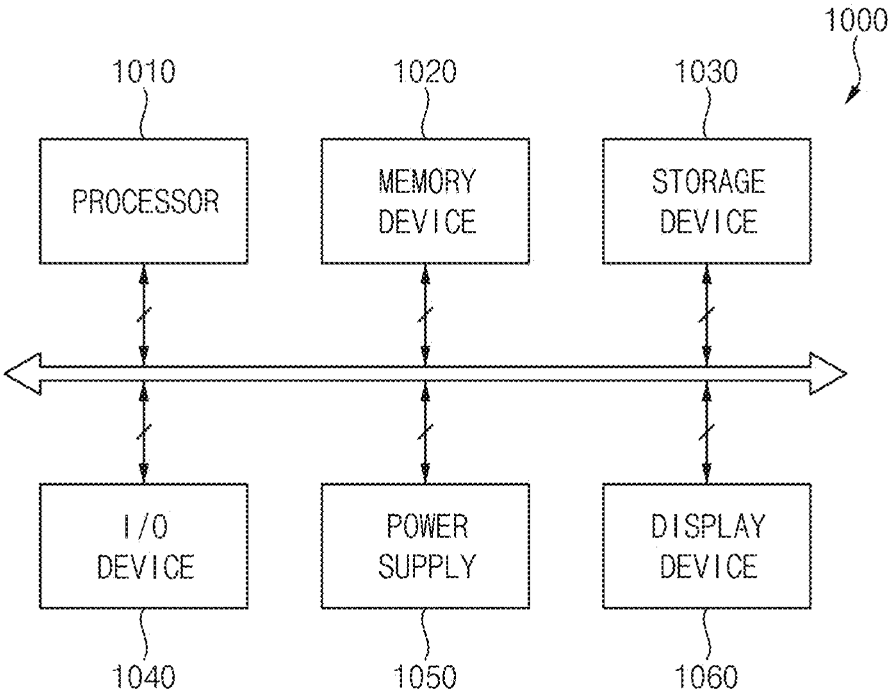
FIG. 8 is a block diagram illustrating an electronic device.
Figure 9:
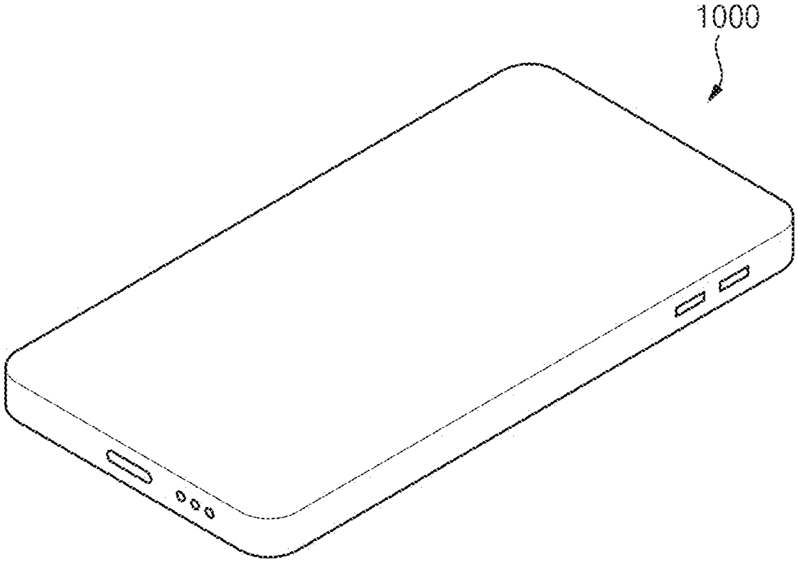
FIG. 9 is a diagram illustrating embodiments in which the electronic device 1000 of FIG. 8 is implemented as a smart phone.

FIG. 8 is a block diagram illustrating an electronic device 1000. FIG. 9 is a diagram illustrating embodiments in which the electronic device 1000 of FIG. 8 is implemented as a smart phone.

Referring to FIGS. 8 and 9, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

According to some embodiments, as illustrated in FIG. 9, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

Embodiments according to the present disclosure may be applied to any display device and any electronic device including the touch panel. For example, embodiments according to the present disclosure may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of aspects of some embodiments of the present disclosure and is not to be construed as limiting thereof. Although aspects of some embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of embodiments according to the present disclosure as defined in the appended claims, and their equivalents. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. Aspects of some embodiments according to the present disclosure are defined by the following claims, with equivalents of the claims to be included therein.

What is claimed is:

1. A gate driver, comprising:

an input circuit configured to output an input signal to a first control node;

a level control circuit connected between the first control node and a second control node and configured to control a voltage level of the second control node;

a pull down circuit configured to pull down a gate signal to a low gate voltage in response to a voltage of the second control node and to output the gate signal to a gate output node; and a voltage output circuit connected to the gate output node or connected to at least one of the first control node and the second control node and the gate output node, wherein the level control circuit includes:

a first p-type metal-oxide-semiconductor (PMOS) transistor including a gate electrode connected to the first control node, a first electrode configured to receive a clock signal, and a second electrode;

a first capacitor including a first electrode connected to the second electrode of the first PMOS transistor and a second electrode connected to the first control node; and a first n-type metal-oxide-semiconductor (NMOS) transistor including a gate electrode configured to receive the low gate voltage, a first electrode connected to the first control node, and a second electrode connected to the second control node.

2. The gate driver of claim 1, wherein the input circuit includes a second PMOS transistor including a gate electrode configured to receive the low gate voltage, a first electrode configured to receive the input signal, and a second electrode connected to the first control node.

3. The gate driver of claim 1, wherein the pull down circuit includes a third PMOS transistor including a gate electrode connected to the second control node, a first electrode configured to receive the low gate voltage, and a second electrode connected to the gate output node.

4. The gate driver of claim 1, wherein, in response to a voltage of the first control node being lower than a voltage obtained by subtracting a threshold voltage of the first NMOS transistor from the low gate voltage, the first NMOS transistor is configured to be turned on.

5. The gate driver of claim 1, wherein, in a first duration, the input signal has a high gate voltage and the clock signal has the high gate voltage.

6. The gate driver of claim 5, wherein, in the first duration, the input circuit is configured to output the input signal having the high gate voltage to the first control node, the first control node has the high gate voltage, and the first PMOS transistor is configured to be turned off.

7. The gate driver of claim 6, wherein, in the first duration, the first NMOS transistor is configured to be turned off, and the second control node is configured to have the high gate voltage.

8. The gate driver of claim 5, wherein, in a second duration after the first duration, the input signal is configured to have a low gate voltage and the clock signal is configured to have the high gate voltage.

9. The gate driver of claim 8, wherein, in the second duration, the input circuit is configured to receive the input signal having the low gate voltage and is configured to output a first low gate voltage to the first control node, the first control node is configured to have the first low gate voltage, and the first PMOS transistor is configured to be turned on.

10. The gate driver of claim 9, wherein, in the second duration, the first NMOS transistor is configured to be turned off, and the second control node is configured to have the high gate voltage.

11. The gate driver of claim 8, wherein, in a third duration after the second duration, the clock signal is configured to have the low gate voltage.

12. The gate driver of claim 11, wherein, in the third duration, the first PMOS transistor is configured to be turned on, and the voltage of the first control node is configured to be boosted by the first capacitor to have a third low gate voltage.

13. The gate driver of claim 12, wherein, in the third duration, the first NMOS transistor is configured to be turned on, and the second control node is configured to have the third low gate voltage.

14. The gate driver of claim 11, wherein, in a fourth duration after the third duration, the clock signal is configured to have the high gate voltage.

15. The gate driver of claim 14, wherein, in the fourth duration, the first PMOS transistor is configured to be turned on, and a voltage of the first control node is configured to be boosted by the first capacitor to have a first low gate voltage.

16. The gate driver of claim 15, wherein, in the fourth duration, the first NMOS transistor is configured to be turned on, and the second control node is configured to have a second low gate voltage.

17. The gate driver of claim 1, wherein the voltage output circuit includes:

a fourth PMOS transistor including a gate electrode connected to an inverting control node, a first electrode configured to receive a high gate voltage, and a second electrode connected to the gate output node;

a fifth PMOS transistor including a gate electrode connected to the inverting control node, a first electrode configured to receive the high gate voltage, and a second electrode;

a sixth PMOS transistor including a gate electrode, a first electrode configured to receive the high gate voltage, and a second electrode connected to the inverting control node;

a seventh PMOS transistor including a gate electrode configured to receive the clock signal, a first electrode, and a second electrode connected to the inverting control node;

an eighth PMOS transistor including a gate electrode configured to receive the low gate voltage, a first electrode connected to the first control node, and a second electrode connected to the gate electrode of the sixth PMOS transistor;

a ninth PMOS transistor including a gate electrode configured to receive the low gate voltage, a first electrode connected to the second electrode of the fifth PMOS transistor, and a second electrode connected to the second control node;

a second NMOS transistor including a gate electrode configured to receive the input signal, a first electrode configured to receive the low gate voltage, and a second electrode connected to the first electrode of the seventh PMOS transistor; and a second capacitor including a first electrode configured to receive the high gate voltage and a second electrode connected to the inverting control node.

18. A gate driver, comprising:

an input circuit configured to output an input signal to a first control node;

a level control circuit connected between the first control node and a second control node and configured to control a voltage level of the second control node;

a pull up circuit configured to pull up a gate signal to a low gate voltage in response to a voltage of the second control node and to output the gate signal to a gate output node; and a voltage output circuit connected to the gate output node or connected to at least one of the first control node and the second control node and the gate output node, wherein the level control circuit includes:

a first n-type metal-oxide-semiconductor (NMOS) transistor including a gate electrode connected to the first control node, a first electrode configured to receive a clock signal, and a second electrode;

a first capacitor including a first electrode connected to the second electrode of the first NMOS transistor and a second electrode connected to the first control node; and a first p-type metal-oxide-semiconductor (PMOS) transistor including a gate electrode configured to receive a high gate voltage, a first electrode connected to the first control node, and a second electrode connected to the second control node.

19. The gate driver of claim 18, wherein the input circuit includes a second NMOS transistor including a gate electrode configured to receive the high gate voltage, a first electrode configured to receive the input signal, and a second electrode connected to the first control node.

20. A display device, comprising:

a display panel; and a gate driver configured to provide a gate driver to the display panel, wherein the gate driver includes:

an input circuit configured to output an input signal to a first control node;

a level control circuit connected between the first control node and a second control node and configured to control a voltage level of the second control node;

a pull down circuit configured to pull down a gate signal to a low gate voltage in response to a voltage of the second control node and to output the gate signal to a gate output node; and a voltage output circuit connected to the gate output node or connected to at least one of the first control node and the second control node and the gate output node, wherein the level control circuit includes:

a first p-type metal-oxide-semiconductor (PMOS) transistor including a gate electrode connected to the first control node, a first electrode configured to receive a clock signal, and a second electrode;

a first capacitor including a first electrode connected to the second electrode of the first PMOS transistor and a second electrode connected to the first control node; and a first n-type metal-oxide-semiconductor (NMOS) transistor including a gate electrode configured to receive the low gate voltage, a first electrode connected to the first control node, and a second electrode connected to the second control node.

21. An electronic device, comprising:

a display panel;

a gate driver configured to provide a gate driver to the display panel; and a power supply configured to provide a power to display panel and the gate driver, wherein the gate driver includes:

an input circuit configured to output an input signal to a first control node;

a level control circuit connected between the first control node and a second control node and configured to control a voltage level of the second control node;

a pull down circuit configured to pull down a gate signal to a low gate voltage in response to a voltage of the second control node and to output the gate signal to a gate output node; and a voltage output circuit connected to the gate output node or connected to at least one of the first control node and the second control node and the gate output node, wherein the level control circuit includes:

a first p-type metal-oxide-semiconductor (PMOS) transistor including a gate electrode connected to the first control node, a first electrode configured to receive a clock signal, and a second electrode;

a first capacitor including a first electrode connected to the second electrode of the first PMOS transistor and a second electrode connected to the first control node; and a first n-type metal-oxide-semiconductor (NMOS) transistor including a gate electrode configured to receive the low gate voltage, a first electrode connected to the first control node, and a second electrode connected to the second control node.

* * * * *